US007954708B2

(12) United States Patent
Blossom

(10) Patent No.: US 7,954,708 B2
(45) Date of Patent: Jun. 7, 2011

(54) SELECTABLE MULTI-PURPOSE CARD

(75) Inventor: George Blossom, West Chester, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 12/495,068

(22) Filed: Jun. 30, 2009

(65) Prior Publication Data

US 2009/0261161 A1 Oct. 22, 2009

Related U.S. Application Data

(60) Continuation of application No. 11/276,348, filed on Feb. 24, 2006, now Pat. No. 7,591,416, which is a continuation of application No. 11/011,683, filed on Dec. 15, 2004, now Pat. No. 7,191,952, which is a division of application No. 10/436,466, filed on May 13, 2003, now Pat. No. 7,163,153, which is a division of application No. 09/730,399, filed on Dec. 6, 2000, now Pat. No. 6,631,849.

(51) Int. Cl.
*G06K 5/10* (2006.01)
(52) U.S. Cl. .......................................... 235/380; 235/382
(58) Field of Classification Search .................. 235/380, 235/379, 382, 487, 492
See application file for complete search history.

(56) References Cited

U.S. PATENT DOCUMENTS

| | | | | |
|---|---|---|---|---|
| 5,814,796 A | * | 9/1998 | Benson et al. | 235/375 |
| 6,129,572 A | * | 10/2000 | Feldman et al. | 439/328 |
| 6,213,392 B1 | * | 4/2001 | Zuppicich | 235/380 |
| 6,360,954 B1 | * | 3/2002 | Barnardo | 235/492 |
| 6,505,095 B1 | * | 1/2003 | Kolls | 700/244 |
| 6,557,766 B1 | * | 5/2003 | Leighton | 235/488 |
| 7,591,416 B2 | * | 9/2009 | Blossom | 235/380 |

* cited by examiner

*Primary Examiner* — Daniel St.Cyr
(74) *Attorney, Agent, or Firm* — Hunton & Williams, LLP

(57) ABSTRACT

A selectable, multi-purpose card comprising a plurality of features stored in memory means operatively mounted on the card and selection means for allowing a user to select a feature in a few simple steps, preferably in a single step. In one embodiment the card includes a plurality of magnetic strips positioned on the card in a manner to allow swiping each magnetic strip separately using conventional reading devices. Each magnetic strip activates a different feature of the card. In another embodiment the card includes a programmable magnetic strip, a plurality of features stored in memory means mounted on the card, a plurality of buttons or contacts, and means for programming the magnetic strip with a different card feature. The card may also include a thin, flexible display.

27 Claims, 4 Drawing Sheets

SELECTABLE MULTI-PURPOSE CARD

CROSS-REFERENCE TO RELATED APPLICATIONS

This application is a continuation application of U.S. Ser. No. 11/276,348, filed Feb. 24, 2006 and now issued as U.S. Pat. No. 7,591,416, which was a continuation application of U.S. Ser. No. 11/011,683, filed Dec. 15, 2004 and now issued as U.S. Pat. No. 7,191,952 which was a divisional of U.S. Ser. No. 10/436,466, filed May 13, 2003 and now issued as U.S. Pat. No. 7,163,153, which was a divisional of U.S. Ser. No. 09/730,399, filed Dec. 6, 2000 and now issued as U.S. Pat. No. 6,631,849, each of which are hereby incorporated by reference in their entireties.

FIELD OF THE INVENTION

The present invention relates generally to a financial services vehicle, such as plastic credit cards of the type commonly associated with MASTERCARD®, VISA®, AMERICAN EXPRESS®, ATM banking cards, security cards, or identification cards. More specifically, it relates to a selectable, multi-purpose card having a plurality of features stored in memory means operatively mounted on the card and selection means mounted on the card or a card reader allowing a user to select a card feature in a single step. The features when selected allow the card to function as a different card and/or to perform functions not traditionally available in financial plastic cards.

BACKGROUND OF THE INVENTION

Magnetic cards, such as commercial credit cards, debit cards, or transfer funds cards are widely used for payments, cash advances, or other financial transactions. Data for identifying the customer, such as an account number, a security code, or other identifying data is typically magnetically stored on a magnetic tape or strip embedded into the back side of the card.

When a transaction is to be performed at a retail store, a customer hands his or her card to an employee of the retail store and the employee then scans the magnetic information into a communication device.

When a credit card is utilized in a bank in order to receive a cash advance, the transaction is handled by either a teller or an automated teller machine (ATM). In the case of an ATM, the card is placed inside the ATM and the credit card owner enters a personal identification number (PIN) which is transmitted to the credit card company along with the transaction information. When the PIN number is found to be incorrect, most credit companies send to the credit card user a request to re-enter the PIN number.

Smart cards, i.e., cards having integrated circuit (IC) chips embedded into the cards are also known. A conventional smart card may include a processor coupled to an electrically erasable, programmable, read-only memory (EEPROM), read-only memory (ROM) and random access memory (RAM). These components may be fabricated onto a single integrated chip comprising a microprocessing/controller unit (MPU). The processor executes instructions stored on ROM and temporarily stores data on RAM whereas the EEPROM is a non-volatile memory used for storing data identifying the uniqueness of a smart card. A smart card also may include an input/output (I/O) signal interface for transferring various I/O signals between the smart card and an external system. The I/O interface may take the form of a contact with the external system, or a peripheral thereof, for proper transfer of signals. Alternatively, the I/O interface may take the form of a radio frequency (RF) interface for allowing communication between the smart card and the external system via the transmission and reception of RF signals. The external system may take the form, for example, of a card reader, a merchant's point of sale system, or an automated teller machine.

Typically, power is supplied to the smart card from the external system when the system communicates with the smart card. This may be accomplished through the I/O interface. However, this means that a smart card is only powered and its data is accessible only when the smart card is connected to the external system.

One of the widespread uses of smart card technology is as a stored-value card, which contains monetary value in the microchip embedded in the card. For example, each time a consumer uses a chip card in a vending machine, the amount of the purchase is deducted from the cash balance stored in the microchip on the chip card. One application for such stored-value chip cards is eliminating the need for people to carry around small coins or bills and speed up the time it takes to consummate small cash transactions. However, most chip cards do not offer built-in displays for viewing the cash balance remaining on the chip card. This reduces the convenience and ease of use of chip cards.

Some have suggested including a display to a plastic card in conjunction with input means, such as a keypad for viewing and editing information. For example, U.S. Pat. No. 4,954,985 to Yamazaki describes a smart card with a ferroelectric, liquid crystal memory region and a ferroelectric, liquid crystal display (LCD) region. U.S. Pat. No. 5,777,903 to Poisenka, et al. describes a smart card having a microprocessing unit (MPU) for executing instructions stored in a memory, a liquid crystal display (LCD), coupled to the MPU for displaying information, a keypad, coupled to the MPU and to the display for entering data by the user, an interface for transferring signals between the smart card and the external system when the smart card is coupled to the external system, and photovoltaic cells for providing power to the smart when the smart card is exposed to light.

U.S. Pat. No. 5,590,038 to Pitroda ("Pitroda") describes a card that includes an LCD display and means for selecting between various card features. The means for selecting between the various card features, described by Pitroda, are generally complex, difficult to implement and they will result in a bulky and unpractical plastic card. Moreover, LCDs such as the one suggested by Pitroda have not found wide commercial success in plastic cards. They are generally less flexible than the remainder of the plastic cards, and thus, they tend to fracture under normal use conditions. To prevent LCDs from fracturing the displays would have to be either too small or too thick. Another problem associated with multi-purpose cards, such as the card of Pitroda is that they generally require the user to follow a plurality of steps to select the desired feature. These and other problems with known plastic cards exist.

SUMMARY OF THE INVENTION

It is an object of the present invention to provide a thin, flexible, card that combines the functions of different cards into a single card instrument.

It is another object of the present invention to provide a card that includes a plurality of features and selection means that allow a user to select a desired feature preferably in a single step, prior to presenting the card to a sales person or using the card.

It is yet another object of the present invention to provide a card that may include a thin, flexible display, such as a light-emitting polymer (LEP) display for displaying information denoting the selected feature, and/or other information, or instructions relating to the selected feature. The information may be, for example, account status or recent transaction information or a graphic image such as a logo of the issuing authority.

One aspect of the present invention relates to a selectable, multi-purpose card that includes a plurality of features stored in memory means operatively mounted on the card and selection means mounted on the card for allowing a user to select a feature in only a few simple steps or preferably in a single step. In an alternative embodiment the selection means are mounted on a card reader device. The card reader may also include a display for displaying information relating to the various card features.

Preferably, the card is a thin, flexible card having substantially the same form factor as conventional plastic credit or smart cards of the type commonly associated with MASTER-CARD®, VISA®, and AMERICAN EXPRESS®. Preferably, the card may be from about 80 mm to about 90 mm long, from about 50 mm to about 60 mm wide and from about 0.5 to about 1.5 mm thick.

The card can be, for example, a debit card, a credit card, a transfer funds card, a smart card, a stored-value card, a gift card, an ATM card, a security card or an identification card. The features may allow the card to function as a different card, such as a credit card, debit card, ATM bank card, stored value card, security card, identity card and the like. The card may also include means for providing or processing either account, identity, payment, health, transactional, or other information and communicating with central processing units or computers operated by the providers of services, such as credit card institutions, banks, health care providers, universities, retailers, wholesalers or other providers of goods or services employers, or membership organizations. Card features may also enable the card to communicate with or be accessed by other devices, including those used by retailers (point of sale computers), and personal computers used in other business applications or at home, for example, personal computer using a built-in or attached card reader.

A card feature may be selected by a variety of means, such as by input at the merchant point of sale, on the Internet, network, or similar virtual location, through an associated input device, or preferably by means included on the plastic card itself.

In one embodiment of the present invention, a card is provided which includes a plurality of magnetic strips, each magnetic strip containing information that allows activation of a different card feature. Preferably, the magnetic strips are positioned on the card in a manner that allows them to be read by simply swiping them in a conventional magnetic reading device such as an ATM machine or any other magnetic strip reader. However, in alternate embodiments, swiping may require a particular orientation of the card, and/or a particular depth setting of the magnetic stripe reader in order to access the appropriate feature, account, identity or other information stored on the card.

In another embodiment of the present invention a card is provided which includes a programmable magnetic strip, a plurality of features stored in memory means mounted on the card, a plurality of buttons or contacts for selecting between the features, and means for programming the magnetic strip with a different card feature. The user can select a feature by depressing or touching the buttons and or contacts which causes the programming means to program the magnetic strip with information that activates the selected feature. The user can then scan the card in a magnetic reader device. Preferably, the card of the present invention may contain a display for displaying information denoting the selected feature, or other information and instructions relating to the selected feature. More preferably, the display may be a light-emitting polymer (LEP) display. Alternatively, a card reader may be provided comprising selection means and a display for selecting and displaying a card feature.

In yet another embodiment of the present invention, a card is provided that includes a display, preferably an LEP display, and a keypad for selecting a different card feature and/or editing information relating to the selected feature. Suitable light emitting polymeric materials include conjugated polymers such as poly (ρ-phenylene vinylene) (PPV), PPV derivatives, pyridine containing polymers and copolymers such as poly (ρ-pyridine) (PPy), poly (ρ-pyridyl vinylene) (PPyV), copolymers of PPyV and PPV derivatives (PPyVP $(R)_2V$) with various functional side groups $R=C_{12}H_{25}$, $OC_{16}H_{33}$, $COOC_{12}H_{25}$, strapped copolymer, and other conjugated polymers and copolymers.

Means also may be provided for providing storing, and recharging electric power and for selectively providing power to the components to the card. The card may also include security means for preventing unauthorized use of the card and for preventing unauthorized access to the information stored in the memory means of the card.

The present invention also relates to a method for conducting an electronic transaction comprising providing a selectable multi-purpose card and a card reader; establishing an electronic communication between the card and the card reader, selecting a card feature, and conducting an electronic transaction corresponding to the selected card feature.

Other features and advantages of the invention will become apparent from the description of preferred embodiments in conjunction with the following figures.

DETAILED DESCRIPTION OF THE PREFERRED EMBODIMENTS

Figure 1:
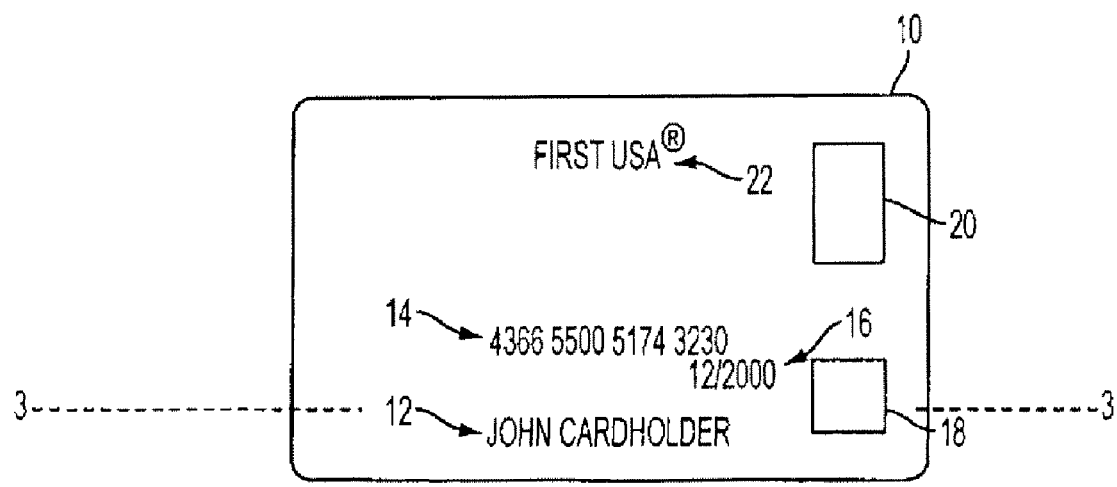
FIG. 1 is a front view of a card according to one embodiment of the present invention.
Figure 2:
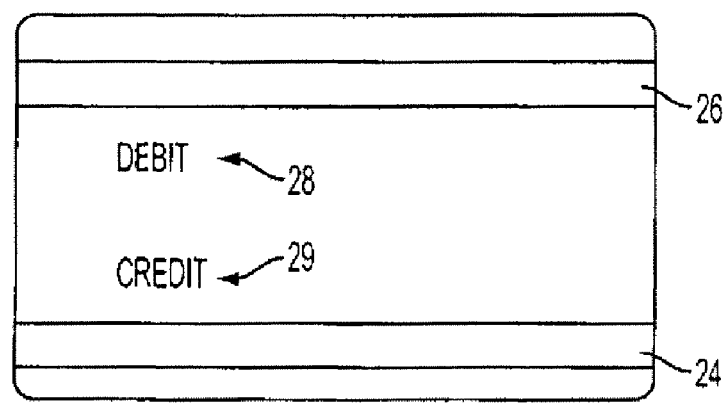
FIG. 2 is a rear view of the card of FIG. 1.

Referring to FIGS. 1 and 2, a preferred embodiment of the present invention card is provided. The front face of the card 10 has embossed letters 12 which identify the authorized user of the card 10. It further includes embossed account numbers 14 which identify the account associated with the card 10. For example, if the card is used as a credit card the account number 14 identifies the credit account from which charges are deducted when a purchase or cash advance is made.

The front face of the card 10 further may also include numbers 16 denoting the expiration date of the card, a logo 18 denoting the issuing authority such as VISA®, MASTER- CARD®, AMERICAN EXPRESS®. The front face of the card 10 may further include one or more conventional design elements such as a hologram 20, and printed letters 22 denoting the financial institution issuing the card.

The rear face of the card 10 includes two magnetic strips 24 and 26. Each magnetic strip 24 is programmed with a code corresponding to a particular feature of the card and an authorization code. Embossed or printed characters 28, 29 positioned adjacent the magnetic strips 26, 24, respectively, denote the card feature that can be activated by swiping each magnetic strip. Magnetic strips 24 and 26 can be read using conventional magnetic reader devices. Magnetic strips 24 and 26 are preferably positioned in a manner that allows selection of a desired feature by simply swiping magnetic strip with the desired feature through a conventional magnetic reader device such as an ATM machine. Card 10 has width, length, and thickness dimensions similar to those of conventional plastic cards. For example, a card 10 may be about 86 mm long, about 55 mm wide, about 0.8 mm thick, and may meet other ISO Standards associated with such cards.

Figure 3A:
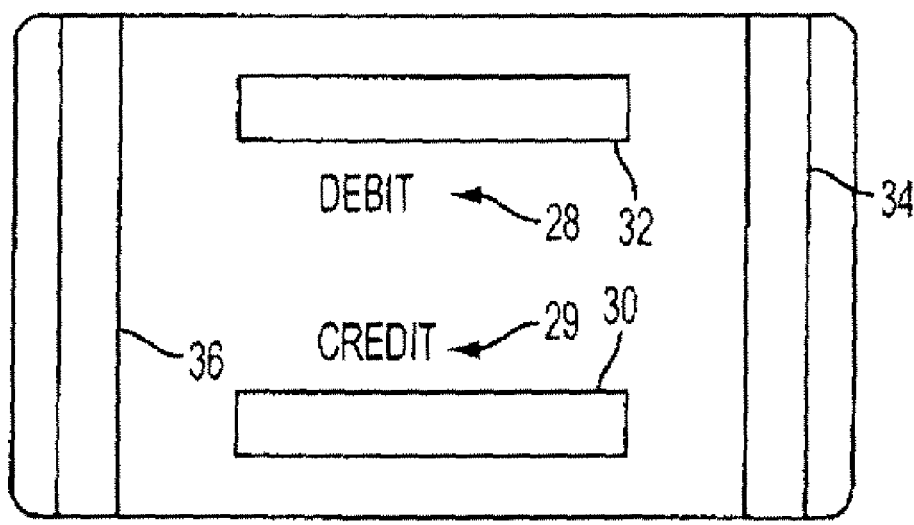
FIG. 3A is a rear view of a card according to another embodiment of the present invention.

FIG. 3A illustrates an alternative embodiment where card 10 has four magnetic strips 30, 32, 34, and 36 embedded on the rear face of card 10, which are preferably positioned sufficiently close to the edges of the card 10 to permit scanning by simply swiping conventional magnetic reader devices. However, it should be understood that the present invention is not limited to the aforementioned configuration and positioning of the magnetic strips, and that other embodiments can be envisioned by a person skilled in the art from the disclosure of the present invention. For example, the magnetic strips may be on the front or the rear face of the card.

Figure 3B:
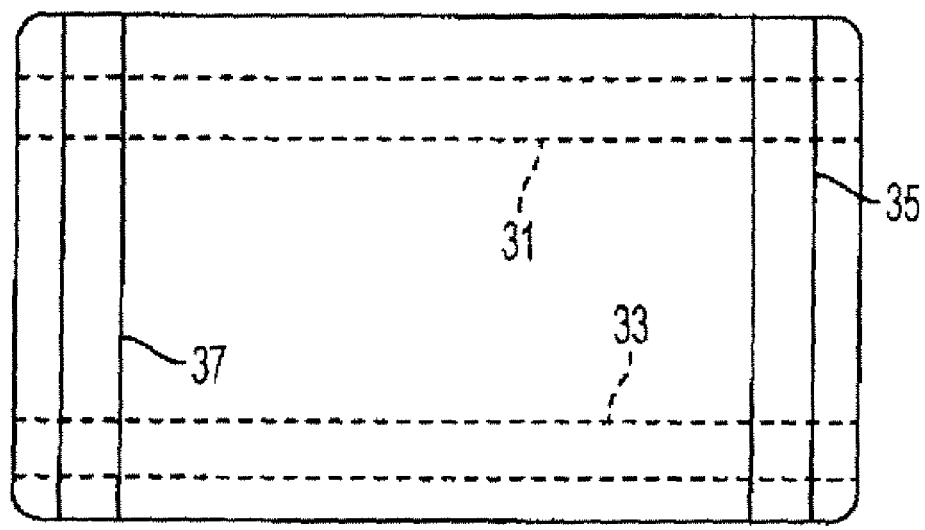
FIG. 3B is a rear view of a card according to another embodiment of the present invention.

FIG. 3B illustrates an embodiment of the present invention wherein a card has vertical magnetic strips 35 and 37 positioned on the rear face of the card and horizontal magnetic strips 31 and 33 positioned on the front face of the card. The length and width of the magnetic strips may vary. For example, the horizontal magnetic strips 31 and 33 may extend the whole length of the front face of the card as shown in FIG. 3B.

Figure 4:
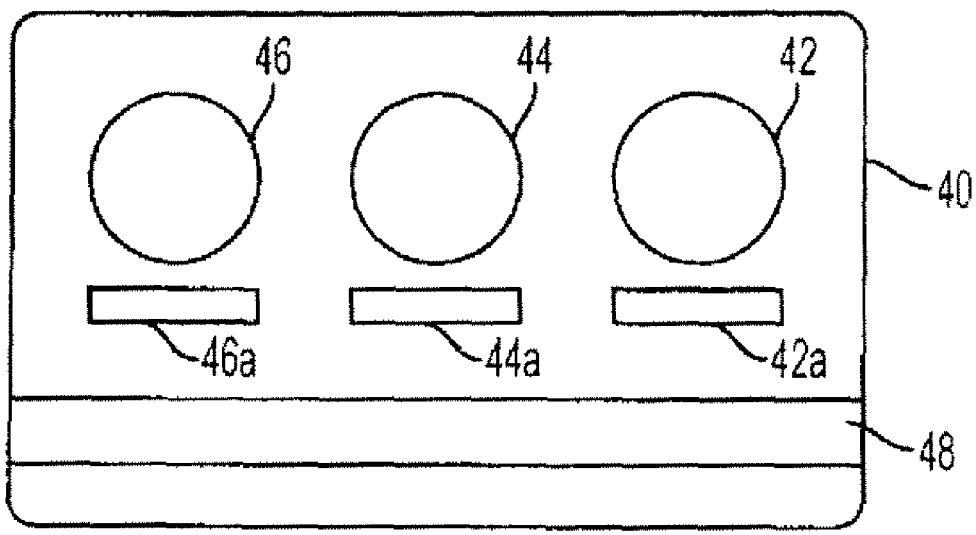
FIG. 4 is a rear view of a card according to yet another embodiment of the present invention.
Figure 5:
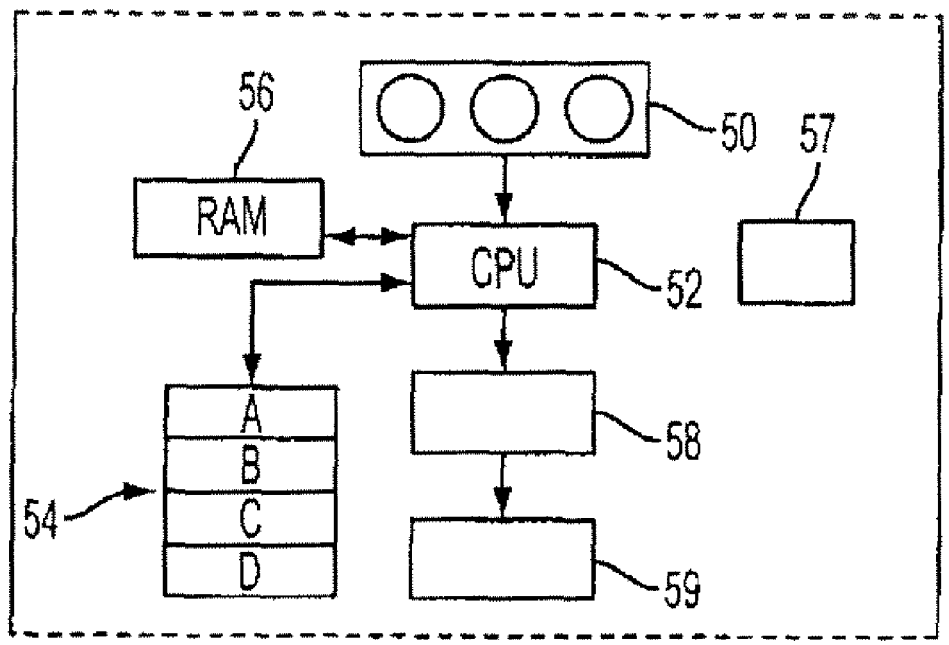
FIG. 5 is a block schematic of exemplary systems and circuits that may be employed in the card of FIG. 4.

Referring to FIGS. 4 and 5 another embodiment of the present invention is provided. FIG. 4 illustrates the rear face of a smart card 40 having a plurality of buttons 42, 44, and 46, each button activating a different card feature. For example, buttons 42, 44, and 46 may be depressible or touch sensitive buttons. Optionally, the rear face of the smart card 40 may further include characters 42a, 44a, and 46a denoting the card feature corresponding to each button 42, 44 and 46, respectively. The back face of the smart card 40 may also include a programmable magnetic strip 48. The magnetic strip is encoded with a code number or some other key corresponding to a card feature selected by the user by depressing or touching a button corresponding to that feature. To accomplish this the smart card 40 may, for example, include the systems and circuits illustrated in FIG. 5. Referring now to FIG. 5, card 40 includes a central processing unit (CPU) 52, a read-only memory (ROM) 54, dynamic memory (RAM) 56, a power supply system 57, an input control circuit 50, a magnetic strip controller 58 and an inductor 59. The power supply system 57 may be any of many well known systems such as, for example, a solar cell connected to a rechargeable battery. In operation, the CPU 52 receives power from the power supply system 57 and distributes the power to the other systems and circuits by a programmed sequence of steps which is stored in the ROM 54.

The smart card 40 may also include a display (not shown). For example, after a selection of a feature is made, a graphic image may appear on the display which looks like the face of a conventional credit card, including the account number, the user's name, the name of the credit card company and its logo. Thereafter, the user may present the card to the point of sales terminal for a sales transaction. The display is preferably a thin, flexible LEP display.

Memory 54 may be divided into a plurality of discrete portions, i.e., a common portion A containing information such as the identity of the user and a basic account number and individual discreet portions B, C and D. Each discrete portion B, C, D may contain at least a code or some other key that allows access to a specific card feature. In operation, the user may select a card feature by depressing one of the buttons 42, 44 or 46. The button controller circuit 50 is operatively connected to the CPU 52. The button controller circuit 50 detects which button is depressed and sends this information to the CPU 52. The CPU 52, in turn, uses this information to read the code and any other information stored in a discreet portion of memory 54 that corresponds to the button depressed by the user. The CPU 52 also may read the user information stored in the common portion A of memory 54, and store the code and user information in the RAM 56.

The magnetic strip 48 is then encoded with the code, user and any other information stored in the RAM 56. This encoding may be achieved by many different methods known in the art such as the one described, for example, in U.S. Pat. No. 4,868,376 to Lessin et al. which is incorporated herein by reference for all purposes to the extent that is not inconsistent with the disclosure and claims of the present invention.

For example, data to be communicated may be output from a processor and converted by magnetic strip control circuit 58. Magnetic strip control circuit 58 may output a signal that drives an inductor 59 to generate a magnetic field pattern which can be read by a card reading device. Signals representing the data to be communicated are output serially, thus emulating data encoded on a magnetic strip.

Preferably, the data is only temporarily preserved on the magnetic strip 48. After a certain predetermined period of time sufficient for completion of the transaction, for example, five minutes, the processor may supply a signal to the magnetic strip control circuit which eliminates the generation of the magnetic field, thereby decoding or erasing the magnetic strip.

In a variation of the above embodiment, instead of, or in addition to the buttons 42, 44, and 46, the plastic card may contain at least one pair of contacts which are exposed on at least one surface of the card. The contacts are designed to allow a user of the card to select a feature corresponding to the pair of contacts by bridging the exposed contacts with his finger.

In an alternative embodiment of the present invention a smart card is provided comprising a plurality of features stored in a plurality of chips operatively mounted on the card and a plurality of contact interfaces corresponding to each chip. The contact interfaces may be mounted on the front or rear face of the card for allowing a user to select a card feature separately using a smart card reader to activate a card feature via a contact interface. The contact interfaces are preferably positioned on the card to allow scanning or reading using conventional smart card readers.

In yet another embodiment, the card may include a thin, flexible, LEP display. The LEP display may cover, for example, a portion of the surface of the card or it may cover the whole surface of at least one side of the card. By selecting a feature of the card as described above, information denoting the selected feature, other information and/or instructions relating to the selected feature may appear on the display. The information may, for example, be an image, characters, numbers or any combination thereof denoting the credit card issuing authority, the credit card company and its logo. The display may be touch-sensitive, e.g., it may provide the user with a number of graphical images which enable the user to selectively chose a card feature by touching selected parts of the touch-sensitive display.

For example, a user may select a feature of the card, such as a stored-value feature. The LEP display, mounted preferably on the front side of the card (not shown), will then display the characters "STORED-VALUE" and the remaining amount in the stored value card.

In one embodiment the LEP display may comprise a semiconductor layer in the form of a thin dense polymer film comprising at least one conjugated polymer, a first electrode in contact with a first surface of the semiconductor layer and a second electrode in contact with a second surface of the semiconductor layer. The polymer film should have a sufficiently low concentration of extrinsic charge carriers so that on applying an electric potential between the first and second electrodes in a manner that renders the second electrode positive relative to the first contact layer charge carriers are injected into the semiconductor layer and light is emitted from the semiconductor layer.

In yet another embodiment, the LEP display comprises an electron transporting layer in contact with an electron blocking polymer, the electron blocking polymer incorporating a network electrode polymer. The LEP display is connected to a source of electrical current via electrodes so as to supply the electron transporting polymer with a flow of electrons, and to cause an electroluminescent emission from the heterojunction between the electron transporting polymer and the electron blocking polymer.

The electron transporting polymer may be any conductive polymeric material of appropriate conductive and electron affinity characteristics to allow it to act as the electron transporting polymer in a light emitting device. Likewise, the electron blocking polymer may be any polymeric material of appropriate electron blocking-polymer characteristics to allow it act as the electron blocking polymer in a light emitting device. The network electrode polymer may be any polymeric material that forms an electrically conducting network polymeric structure within the electron blocking polymer.

Figure 6:
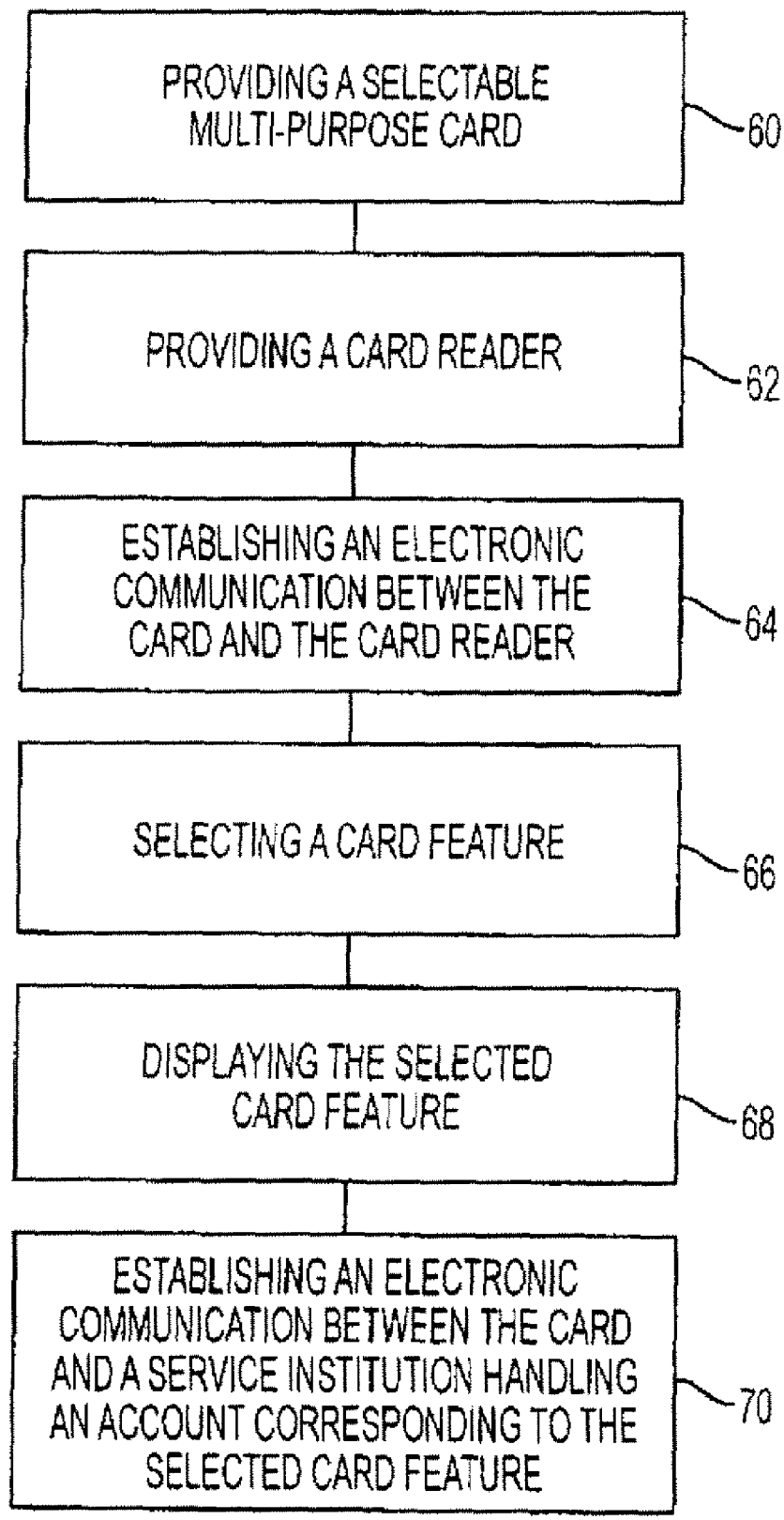
FIG. 6 is a block schematic of a preferred embodiment of the present invention method.

Referring to FIG. 6 a method for conducting an electronic transaction using the selectable multi-purpose card of the present invention is provided. The method comprises providing a selectable multi-purpose card and a card reader, according to blocks 60 and 62, respectively. The card reader may be any conventional reader having means for establishing an electronic communication between the card reader and the card, and means for establishing an electronic communication between the card and a service institution handling an account corresponding to the selected card feature. Preferably, the card reader may also include means for allowing a user to select a card feature and a display for displaying the selected card feature and/or other information relating to the selected card feature.

The method further comprises establishing an electronic communication between the card and the card reader, and selecting a card feature according to blocks 64 and 66, respectively. The selected feature may then be displayed on a display mounted either on the card or the card reader, according to block 68. The method further comprises establishing an electronic communication between the card and a service institution handling an account corresponding to the selected feature, according to block 70.

The foregoing embodiments have been presented for the purpose of illustration and description only and are not to be construed as limiting the scope of the invention in any way. The scope of the invention is to be determined from the claims appended hereto.

What is claimed is:

1. A system comprising:
   a credit card having a display for displaying a first number for a first period of time in response to a user input and displaying a second number for a second period of time response to a second user input; and
   a card reader device, wherein the card reader device is adapted to read the first number and the second number using a plurality of reading mechanisms, wherein at least one mechanism utilizes emulated magnetic stripe data produced by the credit card, wherein at least one of the first number and the second number accessed by the card reader is used to effectuate a financial transaction.

2. The system of claim 1, wherein the plurality of reading mechanisms include at least one of: magnetic stripe reading, a smart card reader contact interface, emulated magnetic stripe data produced by the card, and RFID reading, and a combination of the preceding.

3. The system of claim 1, wherein a first mechanism of the plurality of reading mechanisms is a first magnetic stripe and a second mechanism of the plurality of reading mechanisms is a second, different magnetic stripe, both magnetic stripes being disposed on the same card.

4. The system of claim 1, wherein the first number is communicated wirelessly to the card reader device.

5. The system of claim 1, wherein the first number comprises an account number.

6. The system of claim 1, wherein the first number comprises a security code.

7. The system of claim 1, wherein the first number corresponds to a first financial account different from a second financial account corresponding to the second number.

8. The system of claim 1, wherein the first number is communicated through a component of the credit card to the card reader device during the first period of time and the second number is communicated to the card reader device during the second period of time.

9. The system of claim 1, wherein the credit card further comprises a battery.

10. The system of claim 1, wherein the first number comprises a generated security code.

11. The-system of claim 1, wherein the credit card comprises a processor for providing the first and second numbers.

12. The system of claim 1, wherein the first coded number comprises at least a portion of an account number.

13. The system of claim 1, wherein the first coded number comprises a security code.

14. The system of claim 1, wherein at least a portion of a credit card number is printed or imprinted on the surface of the credit card.

15. The system of claim 1, wherein the credit card includes a manual switch.

16. A method comprising:
   providing a secure number on a payment card;
   displaying on a display of the payment card a first number for a first period of time in response to a user input;
   displaying on the display of the payment card a second number for a second period of time response to a second user input; and
   a card reader device, wherein the card reader device is adapted to read the first number and the second number using a plurality of reading mechanisms, wherein at least one mechanism utilizes emulated magnetic stripe data produced by the payment card, wherein at least one of the first number and the second number accessed by the card reader is used to effectuate a financial transaction.

17. A machine readable medium, executable by a machine, that includes program logic imprinted thereon for performing the method comprising:
  providing a secure number on a payment card;
  displaying on a display of the payment card a first number for a first period of time in response to a user input;
  displaying on the display of the payment card a second number for a second period of time response to a second user input; and
  a card reader device, wherein the card reader device is adapted to read the first number and the second number using a plurality of reading mechanisms, wherein at least one mechanism utilizes emulated magnetic stripe data produced by the payment card, wherein at least one of the first number and the second number accessed by the card reader is used to effectuate a financial transaction.

18. A selectable multi-purpose card comprising:
  at least one programmable magnetic stripe;
  at least one memory;
  at least one selectable portion on the card for switching between a first card function and at least a second card function, wherein the at least one programmable magnetic stripe is programmed for the first card function when the at least one selectable portion of the card is selected for the first card function and the at least one programmable magnetic stripe is programmed for the second card function when the at least one selectable portion of the card is selected for the second card function; and
  at least one light indicator for displaying a selected card function.

19. The selectable multi-purpose card of claim 18, wherein the first card function comprises at least a credit card function and the second card function comprises at least one of a debit card function, a transfer card function, a smart card function, a stored-value card function, a gift card function, a rewards card function, an ATM card function, a security card function, and an identification card function.

20. The selectable multi-purpose card of claim 18, wherein the at least one memory is configured to store information associated with at least each of the first card function and the second card function.

21. The selectable multi-purpose card of claim 19, further comprising:
  a control circuit communicatively coupled to the at least one selectable portion on the card, wherein the control circuit is configured to detect a selected card function of the at least one selectable portion on the card; and
  at least one processor communicatively coupled to the at least one memory and the control circuit, wherein the at least one processor is configured to program the at least one magnetic stripe using the information associated with at least each of the first card function and the second card function stored on the at least one memory and information associated with the selected card function from the control circuit.

22. The selectable multi-purpose card of claim 18, wherein the at least one selectable portion comprises at least one of a depressible button and a touch-sensitive contact.

23. The selectable multi-purpose card of claim 18, wherein the at least one light indicator comprises a light-emitting polymer-based indicator.

24. The selectable multi-purpose card of claim 18, further comprising external indicia, wherein the external indicia comprises a card number, an expiration date, customer name, a first card function identifier, and a second card function identifier.

25. The selectable multi-purpose card of claim 24, wherein the external indicia further comprises a logo or printed characters denoting at least one of an issuing authority and a financial institution issuing the card.

26. The selectable multi-purpose card of claim 18, wherein the at least one magnetic stripe is configured to be readable by magnetic stripe reader devices.

27. The selectable multi-purpose card of claim 18, wherein the card comprises physical dimensions that meet ISO standards associated with magnetic stripe cards.

\* \* \* \* \*